United States Patent
Gaur

(10) Patent No.: US 8,385,272 B2
(45) Date of Patent: Feb. 26, 2013

(54) SYSTEM AND METHOD FOR BURST CHANNEL ACCESS OVER WIRELESS LOCAL AREA NETWORKS

(75) Inventor: Sudhanshu Gaur, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 1135 days.

(21) Appl. No.: 11/923,529

(22) Filed: Oct. 24, 2007

(65) Prior Publication Data

US 2009/0109904 A1    Apr. 30, 2009

(51) Int. Cl.
 *H04W 4/00* (2009.01)
(52) U.S. Cl. ........................................ 370/329
(58) Field of Classification Search .................... None
 See application file for complete search history.

(56) References Cited

U.S. PATENT DOCUMENTS

| | | | |
|---|---|---|---|
| 5,892,754 A | 4/1999 | Kompella et al. | |
| 6,128,507 A * | 10/2000 | Takai | 455/524 |
| 6,965,933 B2 | 11/2005 | Haartsen | |
| 7,623,542 B2 * | 11/2009 | Yonge et al. | 370/445 |
| 7,684,333 B1 * | 3/2010 | Dasylva et al. | 370/235.1 |
| 2002/0163928 A1 * | 11/2002 | Rudnick et al. | 370/444 |
| 2004/0264397 A1 | 12/2004 | Benvesiste | |
| 2005/0036448 A1 | 2/2005 | Leeuwen | |
| 2005/0152373 A1 * | 7/2005 | Ali | 370/395.4 |
| 2006/0227801 A1 | 10/2006 | Nanda et al. | |
| 2007/0064720 A1 * | 3/2007 | Sterenson et al. | 370/445 |
| 2008/0101320 A1 * | 5/2008 | Krahn et al. | 370/342 |

* cited by examiner

*Primary Examiner* — Chirag Shah
*Assistant Examiner* — Amar Persaud
(74) *Attorney, Agent, or Firm* — Mattingly & Malur, P.C.

(57) ABSTRACT

A system comprises a medium access engine operative to contend for access to a channel and to control transmission of data packets onto the channel on behalf of a particular data stream, the particular data stream belonging to a particular access class of a plurality of different access classes, the medium access engine operative to discriminate quality of service based on the different access classes; and a burst channel access engine operative to maintain a burst list of other data streams belonging to the particular access class and to control burst access to the channel based on the burst list on behalf of the particular data stream.

23 Claims, 9 Drawing Sheets

CHANNEL ACCESS FOR THREE TRAFFIC STREAMS IN THE NETWORK

EDCA CHANNEL ACCESS MECHANISM

PREDECESSOR STATION DIAGRAM FOR BURST CHANNEL ACCESS

BCA CHANNEL ACCESS FOR TWO STREAMS

BCA CHANNEL ACCESS FOR TWO STREAMS

CHANNEL ACCESS FOR THREE TRAFFIC STREAMS IN THE NETWORK

FLOWCHART FOR THE PROPOSED BCA CHANNEL ACCESS MECHANISM

WLAN STACK DIAGRAM OF A WIFI PRODUCT

SPECIFICATION OF THE TYPE OF SERVICE OCTET

SYSTEM AND METHOD FOR BURST CHANNEL ACCESS OVER WIRELESS LOCAL AREA NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to wireless local area networks (WLANs), and more particularly provides a system and method for burst channel access over WLANs.

BACKGROUND

As users experience the convenience of wireless connectivity, they are demanding increasing support. Typical applications over wireless networks include video streaming, video conferencing, distance learning, etc. Because wireless bandwidth availability is restricted, quality of service (QoS) management is increasingly important in 802.11 networks.

The original 802.11 media access control (MAC) protocol was designed with two modes of communication for wireless stations (STAs). The first mode, Distributed Coordination Function (DCF), is based on Carrier Sense Multiple Access with Collision Avoidance (CSMA/CA), sometimes referred to as "listen before talk." A wireless station (STA) waits for a quiet period on the network and then begins to transmit data and detect collisions. The second mode, Point Coordination Function (PCF), supports time-sensitive traffic flows. Using PCF, wireless access points (APs) periodically send beacon frames to communicate network identification and management parameters specific to the wireless local area network (WLAN). Between beacon frames, PCF splits: time into a contention period (CP) where the STAs implement a DCF protocol, and a contention-free period (CFP) where an AP coordinates access by the various STAs based on QoS requirements.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distributed Channel Access (EDCA) introduces the concept of access classes (or traffic categories). Using EDCA, STAs try to send data after detecting that the wireless medium is idle for a set time period defined by the corresponding access class (AC). A higher-priority AC will have a shorter wait time than a lower-priority AC. While no guarantees of service are provided, EDCA establishes a probabilistic priority mechanism to allocate bandwidth based on ACs.

The IEEE 802.11e EDCA standard provides QoS differentiation by grouping traffic into four ACs, i.e., voice, video, best effort and background. Each transmission frame from the upper layers bears a priority value (0-7), which is passed down to the MAC layer. Based on the priority value, the transmission frames are mapped into the four ACs at the MAC layer. The voice (VO) AC has the highest priority; the video (VI) AC has the second highest priority; the best effort (BE) AC has the third highest priority; and the background (BK) AC has the lowest priority. Each AC has its own transmission queue and its own set of AC-sensitive medium access parameters. Traffic prioritization for the STAs uses the medium access parameters—the arbitration interframe space (AIFS) interval, contention window (CW, CWmin and CWmax), and transmission opportunity (TXOP)—to ensure that a higher priority AC has relatively more medium access opportunity than a lower priority AC.

Generally, in EDCA, AIFS is the time interval that a STA must sense the wireless medium to be idle before invoking a backoff mechanism or transmission. A higher priority AC uses a smaller AIFS interval. The contention window (CW, CWmin and CWmax) indicates the number of backoff time slots until the STA can attempt another transmission. The contention window is selected as a random backoff number of slots between 0 and CW. CW starts at CWmin. CW is essentially doubled every time a transmission fails until CW reaches its maximum value CWmax. Then, CW maintains this maximum value CWmax until the transmission exceeds a retry limit. A higher priority AC uses smaller CWmin and CWmax. A lower priority AC uses larger CWmin and CWmax. The TXOP indicates the maximum duration that an AC can be allowed to transmit frames after acquiring access to the medium. To save contention overhead, multiple transmission frames can be transmitted within one TXOP without additional contention, as long as the total transmission time does not exceed the TXOP duration. The active STA separates each transmission frame by a short interframe space (SIFS), which is shorter than AIFS.

To reduce the probability of two STAs colliding, because the two STAs cannot hear each other, the standard defines a virtual carrier sense mechanism. Before a STA initiates a transaction, the STA first transmits a short control frame called RTS (Request To Send), which includes the source address; the destination address and the duration of the upcoming transaction (i.e. the data frame and the respective ACK). Then, the destination STA responds (if the medium is free) with a responsive control frame called CTS (Clear to Send), which includes the same duration information. All STAs receiving either the RTS and/or the CTS set a virtual carrier sense indicator, i.e., the network allocation vector (NAV), for the given duration, and use the NAV together with the physical carrier sense when sensing the medium as idle or busy. This mechanism reduces the probability of a collision in the receiver area by a STA that is "hidden" from the transmitter STA to the short duration of the RTS transmission, because the STA hears the CTS and "reserves" the medium as busy until the end of the transaction. The duration information in the RTS also protects the transmitter area from collisions during the ACK from STAs that are out of range of the acknowledging STA. Due to the fact that the RTS and CTS are short, the mechanism reduces the overhead of collisions, since these transmission frames are recognized more quickly than if the whole data transmission frame was to be transmitted (assuming the data frame is bigger than RTS). The standard allows for short data transmission frames, i.e., those shorter than an RTS Threshold, to be transmitted without the RTS/CTS transaction.

With these medium access parameters, EDCA generally works in the following manner:

Before a transmitting STA can initiate any transmission, the transmitting STA must first sense the channel idle (physically and virtually) for at least an AIFS time interval. If the channel is idle after the initial AIFS interval, then the transmitting STA initiates an RTS transmission and awaits a CTS transmission from the receiving STA.

If a collision occurs during the RTS transmission or if CTS is not received, then the transmitting STA invokes a backoff procedure using a backoff counter to count down a random number of backoff time slots selected between 0 and CW (initially set to CWmin). The transmitting STA decrements the backoff counter by one as long as the channel is sensed to be idle. If the transmitting STA senses the channel to be busy at any time during the backoff procedure, the transmitting STA suspends its current backoff procedure and freezes its backoff counter until the channel is sensed to be idle for an AIFS interval again. Then, if the channel is still idle, the transmitting STA resumes decrementing its remaining backoff counter.

Once the backoff counter reaches zero, the transmitting STA initiates an RTS transmission and awaits a CTS transmission from the receiving STA. If a collision occurs during the RTS transmission or CTS is not received, then the transmitting STA invokes another backoff procedure, possibly increasing the size of CW. That is, as stated above, after each unsuccessful transmission, CW is essentially doubled until it reaches CWmax. After a successful transmission, CW returns to its default value of CWmin. During the transaction, the STA can initiate multiple frame transmissions without additional contention as long as the total transmission time does not exceed the TXOP duration.

The level of QoS control for each AC is determined by the combination of the medium access parameters and the number of competing STAs in the network.

The access point (AP) follows generally the same protocol described above, except that instead of employing an AIFS interval, the AP employs a PCF interframe space (PIFS) interval before attempting access to the wireless medium. FIG. 1 is a timing diagram illustrating the SIFS interval, the PIFS interval, and various AIFS intervals. As stated above, the SIFS interval is the time period between packet transmissions of a single STA or AP during a single TXOP. The PIFS interval is the time period that the AP must wait for the medium to remain idle before it initiates a transmission. The PIFS interval is typically defined as the SIFS plus a single slot time, thus assuring that the AP does not initiate a transmission during a STA's TXOP. The shortest possible AIFS interval is defined to be greater than the PIFS interval, thus providing the AP more priority to the wireless medium than the STAs.

While distributed channel access is attractive because of its more practical distributed implementation, it suffers from packet collisions which tend to increase as more STAs try to gain access to the channel. However, the EDCA MAC does not utilize channel efficiently as each STA can transmit only after it gains channel access following contention procedures. This leads to unnecessary contention among STAs belonging to the same access category (AC). Also, different ACs don't preclude the chance of a low priority packet colliding with a higher priority packet.

Example prior art references include the following:
1. U.S. Pat. No. 5,892,754 To Kompella et al.;
2. U.S. Pat. No. 6,965,933 To Haartsen;
3. U.S. Patent Application Publication No. 2004/0264397 to Benvesiste;
4. U.S. Patent Application Publication No. 2005/0036448 to Leeuwen;
5. U.S. Patent Application Publication No. 2006/0227801 to Nanda et al.;
6. IEEE 802.11 WG, "Draft Supplement to Part 11: Wireless Medium Access Control (MAC) and Physical Layer (PHY) Specifications: Medium Access Control (MAC) Enhancements for Quality of Service (QoS)", IEEE 802.11e, November 2005; and
7. C. Lim and C-H. Choi, "TDM-based coordination function (TCF) in WLAN for high throughput", IEEE Global Telecommunications Conference, Vol. 5, pp. 3235-3239, November 2004.

SUMMARY

According to an embodiment, a medium access scheme allows burst transmissions of data streams belonging to the same access category (AC) to a wireless channel. STAs with data streams belonging to a particular AC monitor each other's transmissions on the wireless channel to form a burst list for that AC. After a STA with a data stream of a particular AC gains access to the channel, other STAs on the burst list for that AC follow with data streams belonging to the same AC.

One embodiment follows:
i. All STAs monitor the wireless channel to form a burst list of currently active STAs with data streams belonging to the same AC.
ii. When a STA gains access to the channel, other STAs with data streams belonging to the AC use the channel in a circular fashion at the end of the current transmission after a SIFS duration.
iii. If the burst list is broken, e.g., due to a STA pausing or halting transmissions, the other STAs either update the burst list or rebuild it.

According to one embodiment, the present invention provides a system comprising a medium access engine operative to contend for access to a channel and to control transmission of data packets onto the channel on behalf of a particular data stream, the particular data stream belonging to a particular access class of a plurality of different access classes, the medium access engine operative to discriminate quality of service based on the different access classes; and a burst channel access engine operative to maintain a burst list of other data streams belonging to the particular access class and to control burst access to the channel based on the burst list on behalf of the particular data stream.

The system may include one of a station or an access point. The medium access engine may perform an EDCA-based protocol. The burst channel access engine may generate the burst list after the medium access engine wins access to the channel. The burst channel access engine may generate the burst list by monitoring data streams that follow it. The burst channel access engine may identify the last data stream that follows it as its predecessor. The burst channel access engine may control burst access by awaiting its predecessor to complete a transmission and initiating transmission after a short interframe space (SIFS) interval. The burst channel access engine may control burst access by monitoring for a failed transmission and responding by updating the burst list. The burst channel access engine may respond to a failed transmission by resetting the burst list. The burst channel access engine may respond to a failed transmission by removing the failed data stream from the burst list. The burst channel access engine may respond to a failed transmission by removing the failed data stream and at least one more data stream from the burst list. The burst channel access engine may maintain the burst list by monitoring for a new data stream belonging to the same access class to access the channel and may update the burst list to include the new data stream.

According to one embodiment, the present invention provides a method comprising contending for access to a channel; controlling transmission of data packets onto the channel on behalf of a particular data stream, the particular data stream belonging to a particular access class of a plurality of different access classes, the controlling including discriminating quality of service based on the different access classes; maintaining a burst list of other data streams belonging to the particular access class; and controlling burst access to the channel based on the burst list on behalf of the particular data stream.

The method may further comprise generating the burst list after the medium access engine wins access to the channel. The step of generating may include monitoring data streams that follow it. The method may further comprise identifying the last data stream that follows it as its predecessor. The step of controlling burst access may include awaiting its predecessor to complete a transmission and initiating transmission after a short interframe space (SIFS) interval. The step of controlling burst access may include monitoring for a failed transmission and the responding includes updating the burst list. The step of maintaining the burst list may include monitoring for a new data stream belonging to the same access class to access the channel and updating the burst list to include the new data stream.

According to one invention, the present invention provides a system comprising contention means for contending for access to a channel; transmission means for controlling transmission of data packets onto the channel on behalf of a particular data stream, the particular data stream belonging to a particular access class of a plurality of different access classes, the transmission means including discriminating means for discriminating quality of service based on the different access classes; burst list means for maintaining a burst list of other data streams belonging to the particular access class; and burst access means for controlling burst access to the channel based on the burst list on behalf of the particular data stream.

DETAILED DESCRIPTION

The following description is provided to enable any person skilled in the art to make and use the invention. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

According to an embodiment, a medium access scheme allows burst transmissions of data streams belonging to the same access category (AC) to a wireless channel. STAs with data streams belonging to a particular AC monitor each other's transmissions on the wireless channel to form a burst list for that AC. After a STA with a data stream of a particular AC gains access to the channel, other STAs on the burst list for that AC follow with data streams belonging to the same AC.

One embodiment follows:

i. All STAs monitor the wireless channel to form a burst list of currently active STAs with data streams belonging to the same AC.

ii. When a STA gains access to the channel, other STAs with data streams belonging to the AC use the channel in a circular fashion at the end of the current transmission after a SIFS duration.

iii. If the burst list is broken, e.g., due to a STA pausing or halting transmissions, the other STAs either update the burst list or rebuild it.

Figure 1:
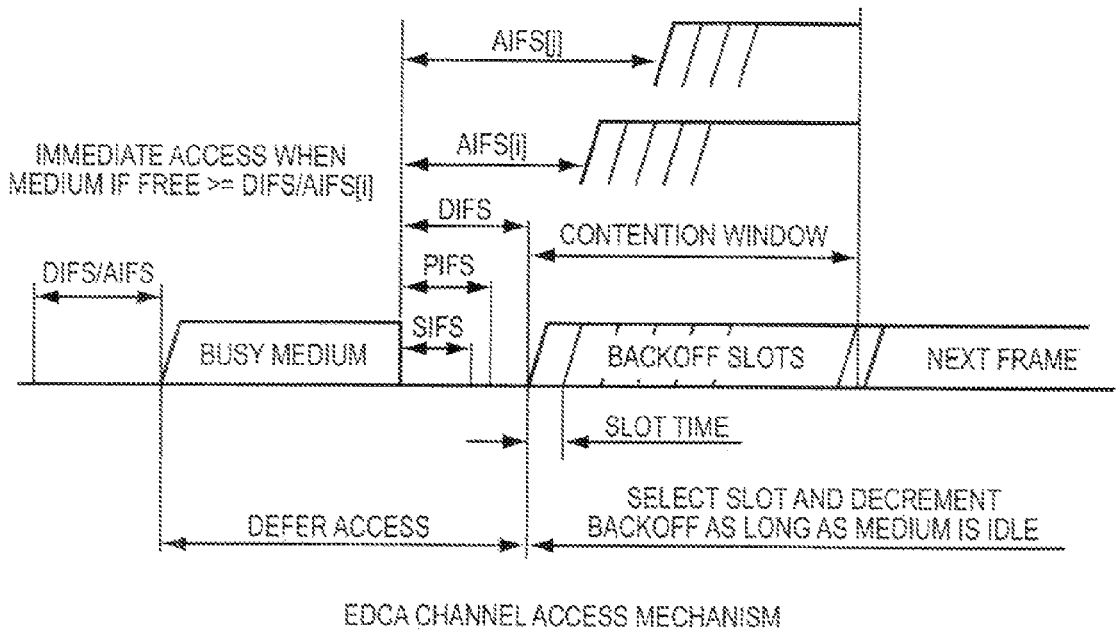
FIG. 1 is a timing diagram illustrating contention for a wireless channel, in accordance with the prior art.
Figure 2:
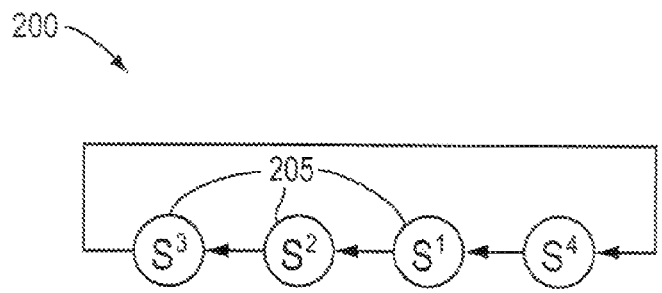
FIG. 2 is a block diagram illustrating burst channel access by multiple data streams, in accordance with an embodiment of the present invention.

FIG. 2 is a block diagram illustrating a burst channel access loop 200 of a series of data streams 205 transmitted by various STAs and/or APs, in accordance with an embodiment of the present invention. Superscripts are used as identifiers for data streams 205 and associated parameters. For example, $S^1$ denotes a first data stream 205 and $TXOP^1$ denotes the associated TXOP burst duration of the first data stream $S^1$. The term "predecessor" for a given data stream 205 identifies the data stream 205 for the same AC which transmitted just ahead of it. As shown, the predecessor for data stream $S^4$ is $S^1$, for $S^1$ is $S^2$, for $S^2$ is $S^3$ and for $S^3$ is $S^4$. A "leader flag" identifies the data stream 205 that initiated the burst transmission. For example, if data stream $S^3$ contends for and gains access to the channel, data stream $S^3$ will have its leader flag set as TRUE. All other data streams will have their leader flags set as FALSE. It will be appreciated that, for convenience, since in certain embodiments various actions and/or attributes are dependent on the data streams themselves, the various actions and/or attributes herein may be described as performed by or belonging to the data streams instead of performed by or belonging to the STAs and/or APs on behalf of the data streams.

Figure 3:
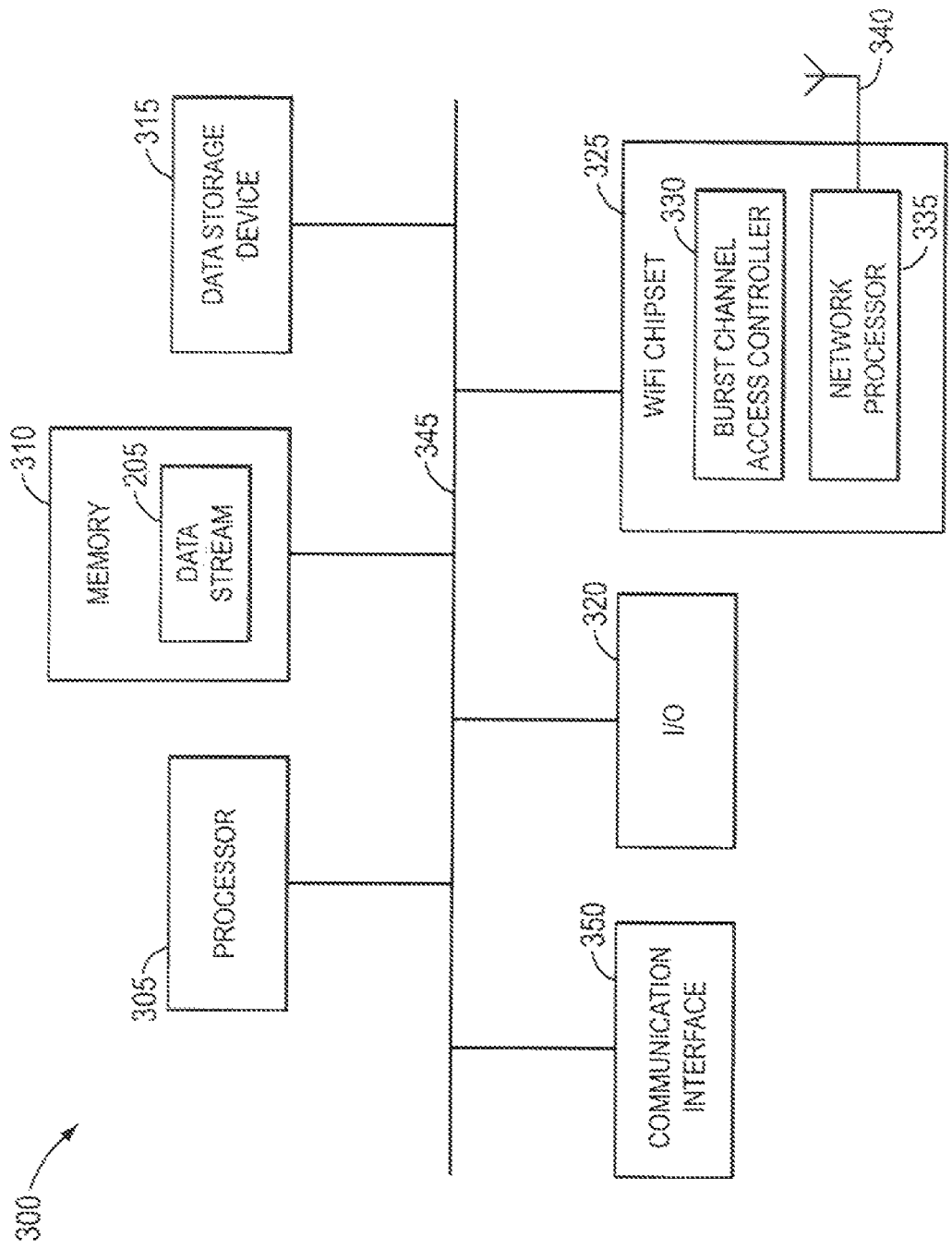
FIG. 3 is a block diagram illustrating details of a STA or AP, in accordance with an embodiment of the present invention.

FIG. 3 is a block diagram illustrating details of a STA or AP 300, in accordance with an embodiment of the present invention. The STA or AP 300 includes a processor 305 (such as an Intel Pentium® microprocessor or a Motorola Power PC® microprocessor), memory 310 (such as random-access memory), a data storage device 315 (such as a magnetic disk), input/output (I/O) 320 (such as a keyboard, mouse and LCD display), a communication interface 350 (such as a broadband modem that may be coupled to the Internet), and a WiFi chipset 325, each coupled to the communication channel 345. One skilled in the art will recognize that, although the memory 310 and the data storage device 315 are illustrated as different units, the memory 310 and the data storage device 315 can be parts of the same unit, distributed units, virtual memory, etc. The term "memory" herein is intended to cover all data storage media whether permanent or temporary.

In one embodiment, the memory 310 stores one or more data streams 205 for transmission on the wireless channel. Alternatively, the data stream 205 may be streamed in via the communication interface 350 from the Internet. The WiFi chipset 325 contains burst channel access controller 330 and a network processor 335 coupled to a wireless antenna 340. Details of the burst channel access controller 330 are described below with reference to FIG. 4.

Figure 4:
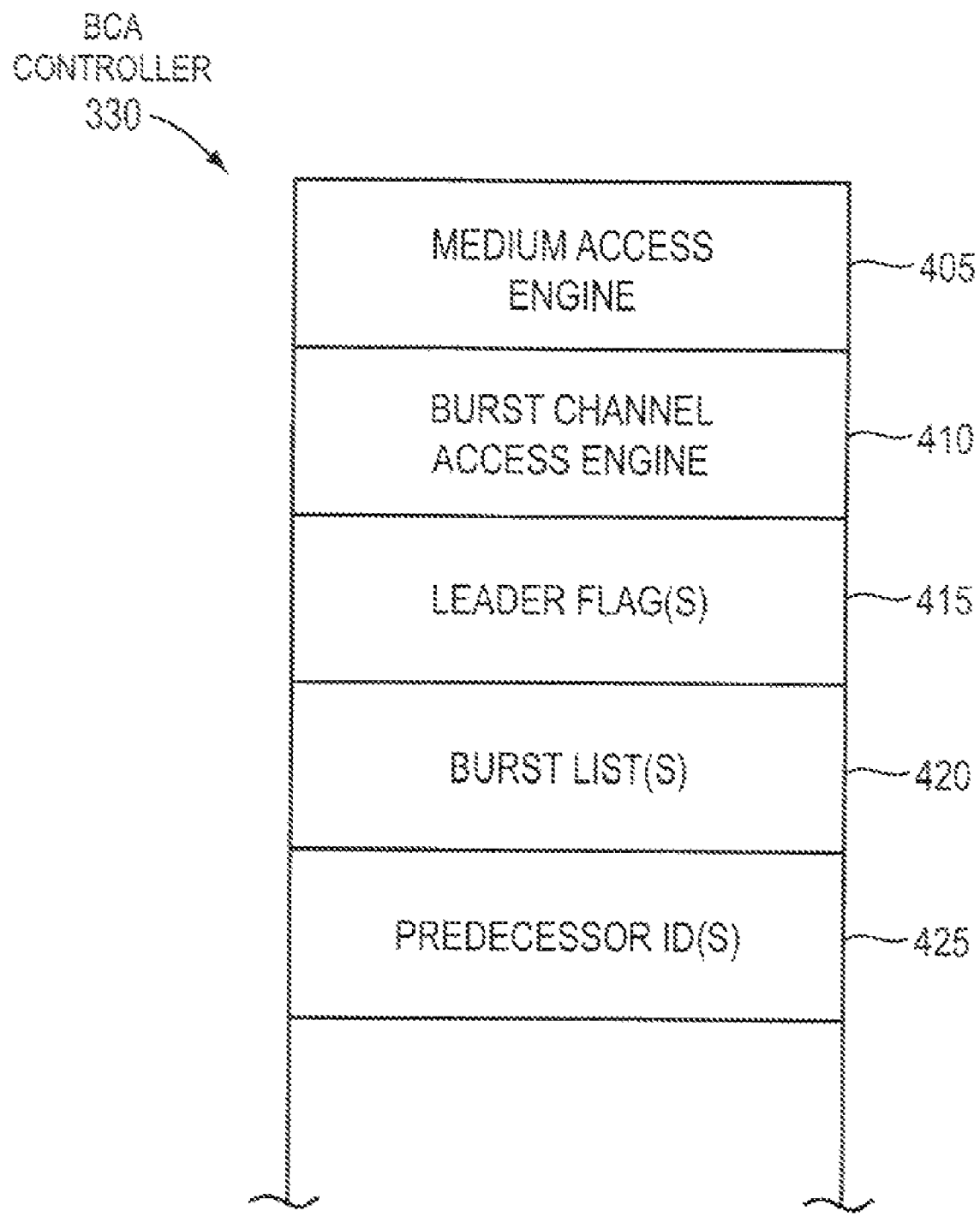
FIG. 4 is a block diagram illustrating details of the burst channel access controller, in accordance with an embodiment of the present invention.

FIG. 4 is a block diagram illustrating details of the burst channel access controller 330, in accordance with an embodiment of the present invention. The burst channel access controller 330 includes a medium access engine 405, a burst channel access engine 410, one or more leader flag(s) 415, one or more burst list(s) 420, and one or more predecessor ID(s) 425.

The medium access engine 405 includes hardware, software and/or firmware to contend for access and to access the wireless channel on behalf of a data stream 205, in accordance with an embodiment of the present invention. In one embodiment, the medium access engine 405 implements a conventional IEEE 802.11e EDCA mechanism to enable a STA and/or AP 300 to contend for access to the channel on behalf of a data stream 205 and to transmit the data stream 205 during a TXOP. The data stream 205 of a STA and/or AP 300 that wins channel access is referred to as a "leader."

The burst channel access engine 410 includes hardware, software and/or firmware to enable burst channel access to the channel by data streams 205 belonging to the same AC, possibly in coordination with the medium access engine 405, in accordance with an embodiment of the present invention.

In response to a new data stream 205 gaining access to the channel, the burst channel access engine 410 managing the new data stream 205 sets the leader flag 415 corresponding to the new data stream 205 to TRUE. The medium access engine 405 transmits the new data stream 205 for a TXOP period. The burst channel access engine 410 monitors the channel to determine whether any other data streams 205 belonging to the same AC transmit thereafter. If no other data streams 205 transmit thereafter, then the burst channel access engine 410 stores its data stream ID (e.g., MAC address, MAC and port address, etc.) in a burst list 420. If one or more other data streams 205 transmit thereafter, then the burst channel access engine 410 stores its data stream ID and the other data stream ID(s) following it in the burst list 420 on behalf of the new data stream 205, possibly in order of transmission. The burst channel access engine 410 stores the data stream ID of the last data stream 205 in the burst access as the predecessor ID 425 for the new data stream 205. In one embodiment, the burst channel access engine 410 recognizes that a data stream 205 is the last data stream 205 by noting a channel idle duration longer that the SIFS interval. In one embodiment, the last data stream ID on the burst list 420 is the predecessor ID 425 for the new data stream 205.

In response to the new data stream 205 gaining access to the channel, the burst channel access engine 410 of each other data stream 205 already on the burst list 420 and belonging to the same AC sets its leader flag to FALSE. The burst channel access engine 410 of the other data stream 205 updates the burst list 420 corresponding to the other data stream 205 to include the new data stream ID, in one embodiment to precede the prior leader. In one embodiment, the burst channel access mechanism 410 for the prior leader updates its predecessor ID 425 to the new data stream ID. The burst channel access engine 410 monitors the data streams 205 on the channel to follow transmission of the data stream 205 that matches its predecessor ID 425, the prior leader following the current leader. After a SIFS interval post the TXOP of its predecessor, the burst channel access engine 410 for the other data stream 205 begins to send its data stream 205. This process repeats in circular order for all data streams 205 on the burst list 420. If a data stream 205 on the burst list 420 fails to transmit, then in one embodiment the burst channel access engine 410 drops the failed data stream 205 and all data streams 205 through the prior predecessor data stream 205 from the burst list 420, so that their burst list 420 matches the burst list 420 of the new leader. Other responses to a failed transmission are also possible.

In response to a particular data stream 205 already on the burst list 420 gaining access to the channel, the burst channel access engine 410 corresponding to the particular data stream 205 sets its leader flag 415 to TRUE. The medium access engine 405 transmits the particular data stream 205 for a TXOP period. The burst channel access engine 410 monitors the channel to confirm that no data streams 205 on the burst list 420 fail to transmit thereafter, e.g., by confirming that a channel idle duration longer than the SIFS interval does not occur before its predecessor transmits. If a data stream 205 on the burst list 420 fails to transmit, then in one embodiment the burst channel access engine 410 erases the entire burst list 420. In another embodiment, the burst channel access engine 410 drops the failed data stream 205 and all data streams 205 through its predecessor stream from the list, and resets its predecessor ID 425 to the current last data stream 205. In yet another embodiment, the burst channel access engine 410 drops only the failed data stream 205 from the burst list 410 and, if the failed data stream 205 is the current predecessor data stream 205, resets its predecessor ID 425 to the current last data stream 205 on the burst list 420. Other responses to failed data streams 205 are also possible.

In response to the particular data stream 205 already on the burst list 420 gaining access to the channel, the burst channel access engine 410 of each other data stream 205 on the burst list 420 and belonging to the same AC sets its leader flag 415 to FALSE. The burst channel access engine 410 of each other data stream 205 monitors the data streams 205 on the channel to follow transmission of the data stream 205 that matches its predecessor ID 425. After a SIFS interval post the TXOP of its predecessor, the burst channel access engine 410 begins to send its data stream 205. This process repeats in circular order for all data streams 205 on the burst list 420. If a data stream 205 on the burst list 420 fails to transmit, then in one embodiment the burst channel access engine 410 erases the entire burst list 420. In another embodiment, the burst channel access engine 410 drops the failed data stream 205 and all data streams 205 through the current leader's predecessor stream from the burst list 420. In yet another embodiment, the burst channel access engine 410 drops only the failed data stream 205 from the burst list 410 and, if the failed data stream 205 is its predecessor data stream 205, resets its predecessor ID 425 to the current last data stream 205 on the burst list 420. In still another embodiment, the current leader can initiate a burst list 420 containing only itself, while all other data streams 205 can reset their burst lists. Other responses to failed data streams 205 are also possible.

In one embodiment, a burst channel access engine 410 with a data stream 205 already on the burst list 420 that has no data to transmit may send a null frame to maintain its place in the burst list 420 until it has data to transmit. In another embodiment, the burst channel access engine 410 may send an end frame to request the other data streams 205 to remove it from the burst list 420 and to inform its successor of its predecessor ID 425.

Figure 5:
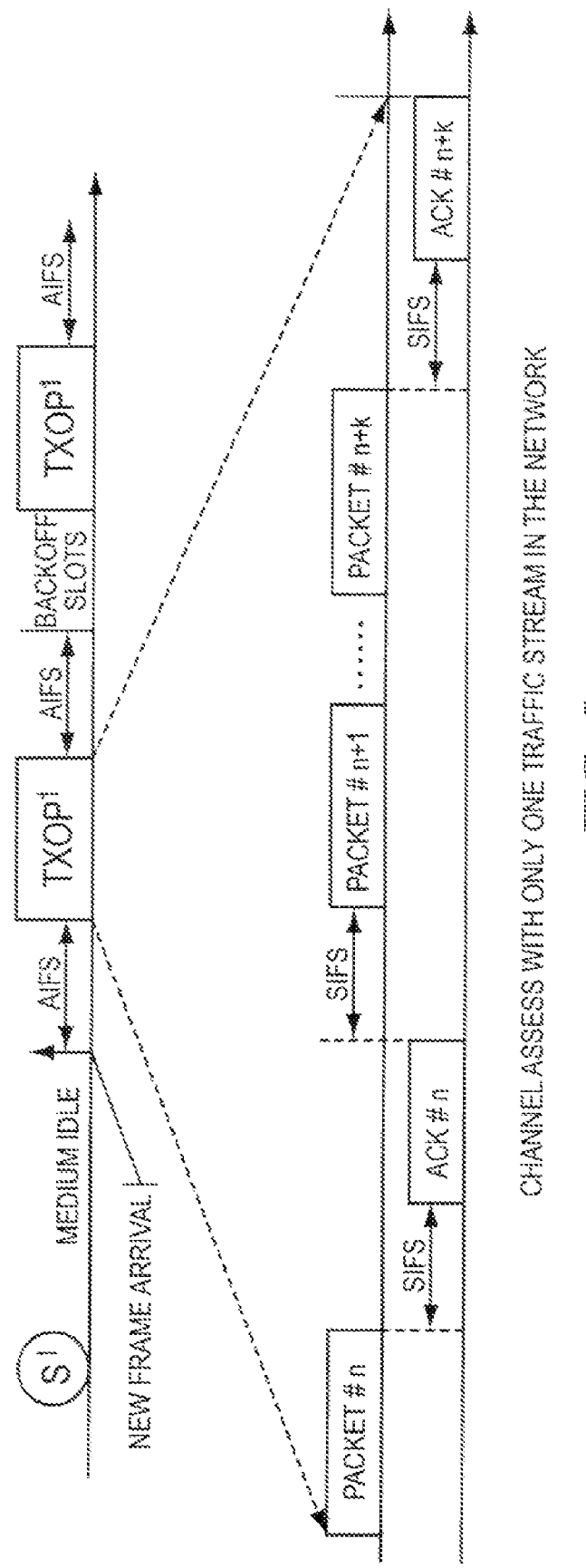
FIG. 5 is a timing diagram illustrating details of a burst channel access for one data stream, in accordance with an embodiment of the present invention.

FIG. 5 is a timing diagram illustrating a burst channel access with only one data stream 205, in accordance with an embodiment of the present invention. Following EDCA procedures, after the channel is idle for at least an AIFS interval for a STA 300 (or a PIFS interval for an AP 300), the STA 300 transmits a TXOP$^1$ on behalf of the data stream 205. Then, if no other data streams 205 follow, after another AIFS interval and any backoff timeslots per EDCA procedures, the STA 300 transmits another TXOP$^1$ on behalf of the data stream 205. As shown, one TXOP$^1$ includes k packets and k ACKs, each separated by a SIFS interval.

Figure 6A:
FIG. 6(a) is a timing diagram illustrating details of a burst channel access for two data streams, in accordance with an embodiment of the present invention.
Figure 6B:
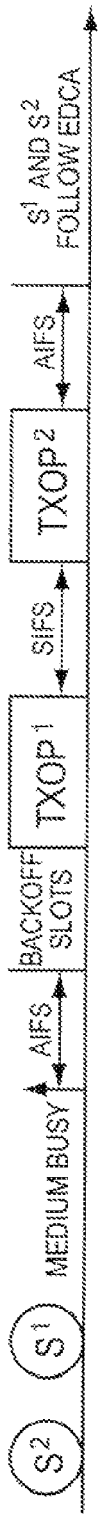
FIG. 6(b) is a timing diagram illustrating details of a burst channel access for two data streams, in accordance with another embodiment of the present invention.

FIG. 6(a) is a timing diagram illustrating details of a burst channel access for two data streams 205 belonging to the same AC, in accordance with an embodiment of the present invention. As shown, S$^1$ and S$^2$ are data streams 205 associated with an AC. Assuming both data streams 205 have frames to transmit, they follow usual EDCA channel access procedures to gain access to the channel. The data stream 205 which wins the channel, in this case data stream S$^2$, initiates a TXOP$^2$ for the data stream 205. After the expiry of TXOP$^2$, the other data stream S$^1$ (based on the burst list 420) waits an SIFS interval before initiating a TXOP$^1$ for its data stream 205. After observing the medium idle for duration equal to corresponding AIFS duration, both STAs reset their backoff counters as well as CW sizes and resume normal EDCA channel access procedures FIG. 6(b) is a timing diagram illustrating details of a burst channel access for the two data streams 205 of FIG. 6(a), however accessing the channel in the opposite order, in accordance with another embodiment of the present invention. If both data streams S$^1$ and S$^2$ are on the burst list 420 and data stream S$^1$ wins channel access during the next contention, data stream S$^2$ follows its transmission, since data stream S$^2$ has data stream S$^1$ as its predecessor and data stream S$^1$ has data stream as its predecessor.

Figure 7:
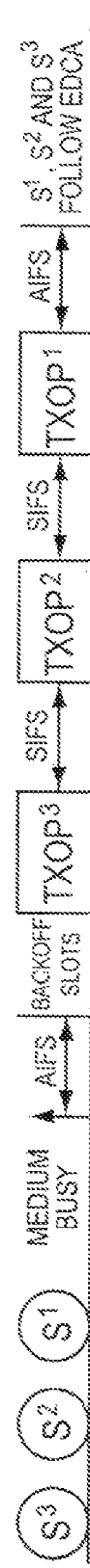
FIG. 7 is a timing diagram illustrating details of a burst channel access for three data streams, in accordance with an embodiment of the present invention.

FIG. 7 is a timing diagram illustrating details of a burst channel access for three data streams 205, in accordance with an embodiment of the present invention. FIGS. 6(a) and (b) show two data streams 205, namely, data stream S$^1$ and data stream S$^2$, negotiating for channel access. If data stream S$^1$ and data stream S$^2$ keep winning the channel ahead of a third data stream S$^3$, then the burst list 420 remains unchanged. If data stream S$^3$ wins the channel, data stream S$^3$ transmits a TXOP$^3$. Depending on a set rule, one of the data stream S$^2$ or the data stream S$^1$ will follow the data stream S$^3$. In one embodiment, the rule may define that the last leader belonging to the same AC follows the new leader. In another embodiment, the rule may define that the last data stream 205 to access the channel follows the new leader. Other rules are also possible.

In one embodiment, the method performs as follows: Let data stream S$^k$ denote the data stream 205 associated with the k$^{th}$ STA. During an initialization phase, the burst list 420 for an AC is empty. All data streams 205 compete for channel access using EDCA procedures. The winning data stream 205, say data stream S$^k$, transmits a TXOP$^k$. Data stream S$^k$ sets its leader flag 415 as TRUE. At this point, only data stream S$^k$ has a non-empty burst list 420 containing only itself. After the TXOP$^k$, all data streams 205 including data stream S$^k$ compete for channel access. If data stream S$^k$ again wins channel access, data stream S$^k$ transmits and contention repeats. If a new stream not belonging to the burst list 420, say data stream S$^j$, wins the channel access, data stream S$^j$ transmits a TXOP$^j$. Data stream S$^j$ sets its leader flag 415 as TRUE. After the transmission of data stream S$^j$ is over, data stream S$^k$ starts transmission after a SIFS duration. Also, data stream S$^k$ resets its leader flag 415 as FALSE. At this point, the burst list contains the j$^{th}$ and k$^{th}$ data streams 205, as shown and described with reference to FIGS. 6(a) and 6(b).

After the current transmission is over, all data streams 205 including those belonging to the burst list 420 compete for channel access. The winning data stream 205 transmits a TXOP and sets its leader flag 415 as TRUE. If the data stream 205 belonged to the burst list 420, its TXOP is followed by TXOPs of the other data streams 205 in the burst list 420, respecting previous burst transmission order (e.g., in a circular fashion). All other data streams 205 in the burst list 420 reset their leader flag 415 as FALSE. If the data stream 205 did not belong to the existing burst list 420, it's TXOP is followed by the TXOP of the data streams 205 in the burst list 420, respecting previous burst transmission order (e.g., in a circular fashion). The new data stream 205 updates its burst list 420 to include itself followed by the existing data streams 205 in the burst list 420. The data streams 205 belonging to the burst list 420 update their burst lists 420 to include the new data stream 205 and reset their leader flags 420 as FALSE. The process repeats.

All transmissions in the burst list 420 are separated by a SIFS interval. If a data stream 205 in the burst list 420 fails to transmit as expected, the burst list 420 is modified, e.g., the burst list 420 is reset to empty; the failed data stream 205 is removed from the list 420; the failed data stream 205 and those that follow it up to the leader are removed from the list 420; or the like.

Figure 8A:
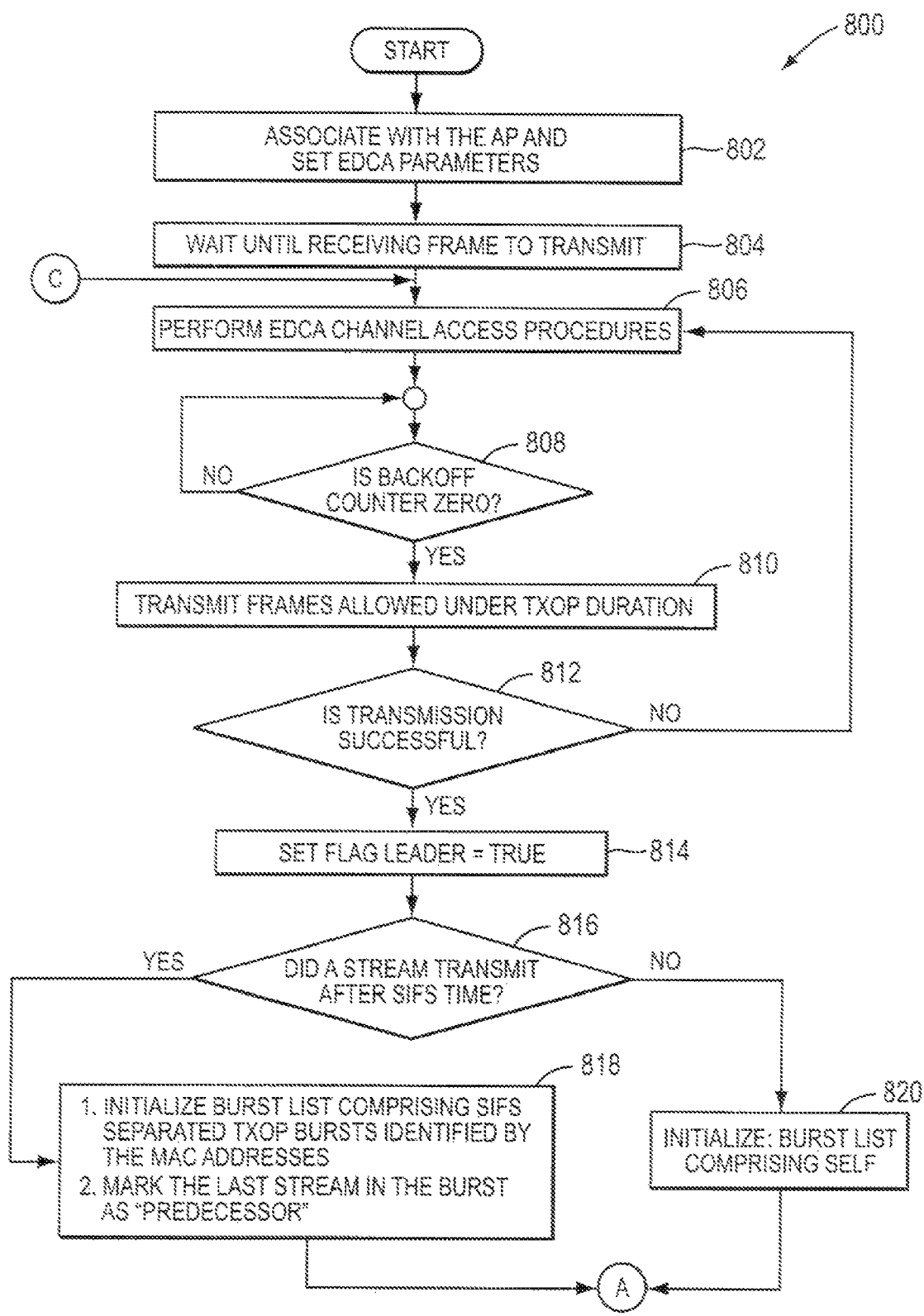
FIGS. 8(a)-8(c) are a flowchart illustrating a method of providing burst channel access to a wireless channel, in accordance with an embodiment of the present invention.
Figure 8B:
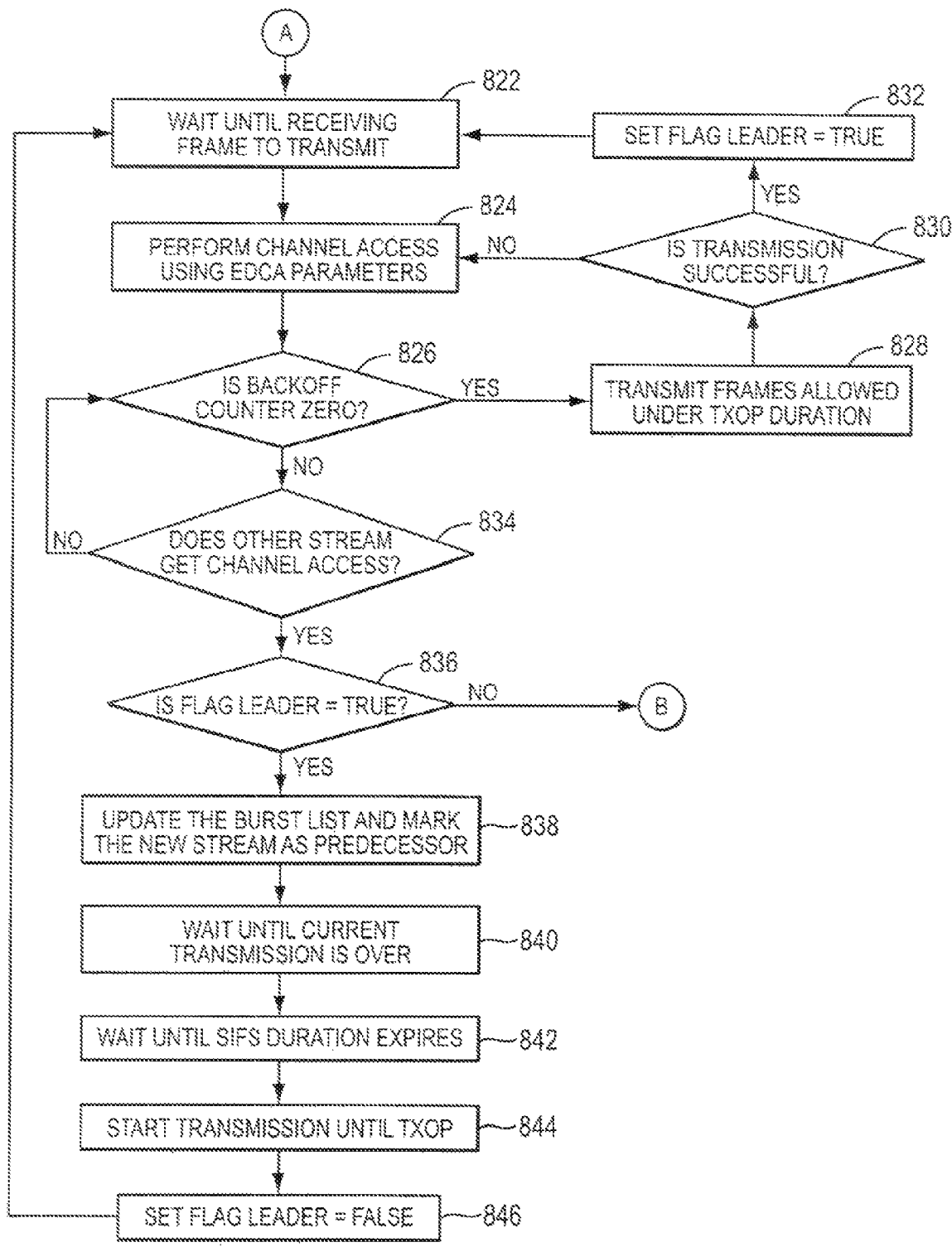
Figure 8C:
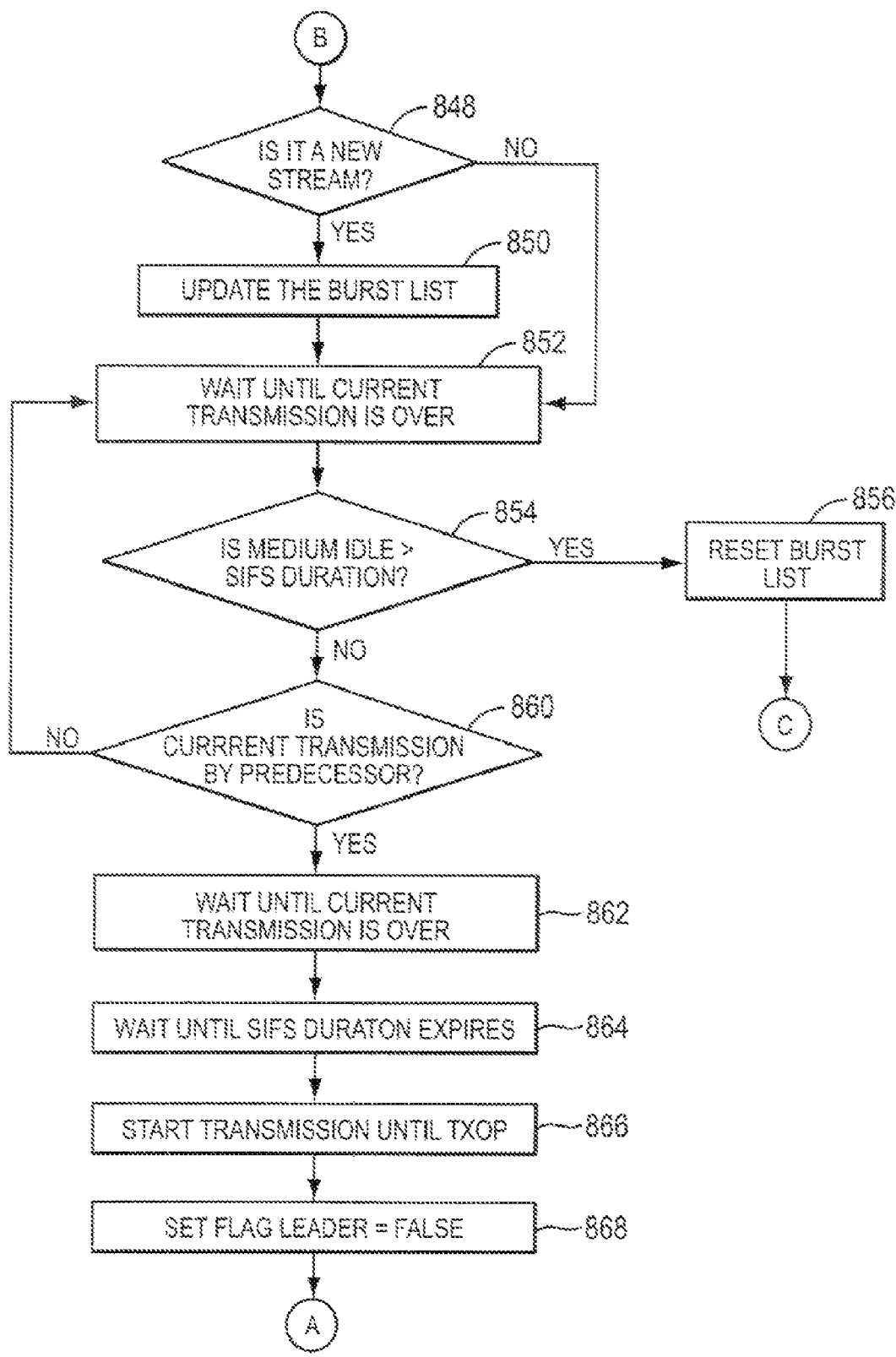

FIGS. 8(a)-8(c) are a flowchart of a method 800 of providing burst channel access to a channel, in accordance with an embodiment of the present invention. Method 800 begins with a STA in step 802 associating with an AP and setting EDCA parameters. The STA in step 804 wait to receive a frame to transmit. The STA on behalf of its data frame in step 806 performs EDCA procedures. The STA in step 808 waits for the expiration of an AIFS interval and any backoff time slots, after which the STA on behalf of its data stream in step 810 transmits frames for a TXOP duration. If in step 812 the STA determines that the transmission is unsuccessful, then the method 800 returns to step 806. If successful, then the STA on behalf of its data stream in step 814 sets the leader flag to TRUE. The STA in step 816 determines whether another data stream transmits after a SIFS interval. If not, then the STA in step 820 creates a burst list containing only itself. If so, then the STA in step 818 creates a burst list containing itself and the data stream IDs following it, possibly in order, and marks the last stream address as its predecessor.

The STA on behalf of its data stream in step 822 waits for a frame to transmit. The STA on behalf of its data stream in step 824 performs channel access using EDCA procedures. The STA on behalf of its data stream in step 826 waits an AIFS interval and any backoff time slots. If no other STA on behalf of its data stream in step 826 gains access to the channel, then the STA on behalf of its data stream in step 828 transmits the frames in a TXOP. The STA on behalf of its data stream in step 830 determines if the transmission was successful. If successful, then the STA on behalf of its data stream in step 832 sets its leader flag as TRUE and method 800 returns to step 822. Otherwise, if unsuccessful, then method 800 returns to step 824.

If in step 834 another STA on behalf of its data stream begins accessing the channel before the STA determines that the AIFS interval and any backoff time slots has expired, then the STA on behalf of its data stream in step 836 determines if it was the previous leader. If not, then method 800 jumps to step 848. Otherwise, the STA on behalf of its data stream in step 838 updates its burst list and marks the new data stream as its predecessor. The STA on behalf of its data stream in step 840 waits until the current transmission is over, in step 842 waits until a SIFS interval has expired, in step 844 starts its TXOP, and in step 846 sets its leader flag to FALSE.

In step 848, the STA on behalf of its data stream determines if the new leader is a new stream, i.e., one that was not on the burst list, or an old stream, i.e., one that is currently on the burst list. If the new leader is an old stream, then the method 800 jumps to step 852. If the new leader is a new stream, then the STA on behalf of its data stream in step 850 updates the burst list to include the new stream and proceeds to step 852. In step 852, the STA on behalf of its data stream begins to wait until the current TXOP is over. The STA on behalf of its data stream in step 854 determines whether the channel is idle for more than a SIFS interval, suggesting that an intermediate STA failed to transmit. If the medium is idle for more than the SIFS interval, then the STA on behalf of its data stream in step 856 resets its burst list. Method 800 then returns to step 806. If the STA on behalf of its data stream in step 854 determines that the channel is not idle for more than a SIFS interval, then the STA on behalf of its data stream in step 860 determines if the current transmission is by its predecessor. If not, then method 800 returns to step 852. If so, then the STA on behalf of its data stream in step 862 waits until the current TXOP is over, in step 864 waits an additional SIFS interval, in step 866 starts its TXOP, and in step 868 sets its leader flag to FALSE. Method 800 then returns to step 822.

Figure 9:
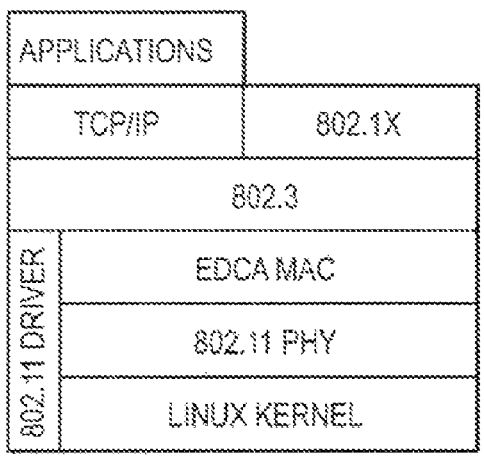
FIG. 9 is a block diagram illustrating a WLAN stack of a WiFi product, in accordance with an embodiment of the present invention.
Figure 9:
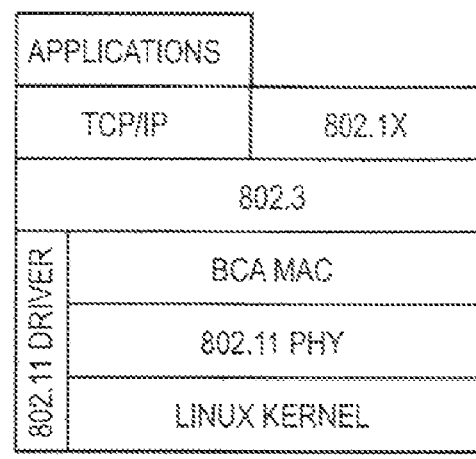

FIG. 9 is a block diagram illustrating a WLAN stack of a WiFi product, in accordance with an embodiment of the present invention. As shown in FIG. 9, in one embodiment, a BCA system may replace the EDCA MAC currently used to guarantee QoS. Alternatively, the BCA system could become an integral part of the standards body IEEE Video Transport Stream (VTS) Task Group. It could become the de-facto MAC protocol for WiFi HD media servers.

Figure 10:
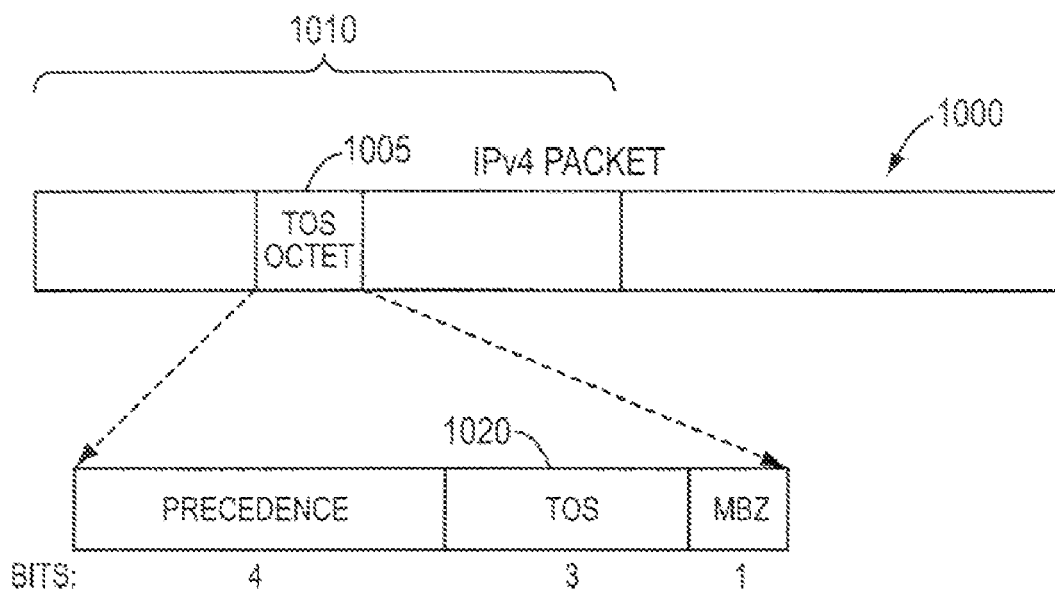
FIG. 10 is a block diagram of the type of service (TOS) octet of a IP datagram header, in accordance with the prior art.

FIG. 10 is a block diagram of the type of service (TOS) octet 1005 of a IP datagram header 1010 of a IP packet 1000, in accordance with the prior art. In IEEE 802.11e EDCA MAC, the TOS octet 1005 includes a 3-bit TOS field that defines the AC. A STA and/or AP 300 can use the TOS field to determine the AC corresponding to the received data stream 205. In another embodiment, since the TXOP limits are different for different ACs (except for BE and BK which have same TXOP duration), a STA and/or AP 300 can monitor the TXOP duration to determine an indication of the TXOP limit used by the transmitting STA and/or AP 300 and thus its AC.

It will be appreciated that, instead of all data streams 205 belonging to the burst list 420 contending for channel, a burst list 420 can designate a leader who performs channel contention, thus eliminating collisions within an AC. The leader can be chosen in a round robin fashion or the original burst leader can be assigned the task to perform channel access. If the leader does not have packets to transmit, the leader may send a packet informing the other data streams 205 to trigger an update of burst list along with designating new burst leader, e.g., based on the order in the burst list.

Given a burst list, some data streams 205 may not always have packets to transmit. In one embodiment, the data streams 205 affected by non-transmission reset their burst list 420 and perform EDCA channel access procedures to rebuild it. In another embodiment, when a data stream 205 has nothing to transmit it can send a "Null frame," so that the burst transmission sequence is not broken. In yet another embodiment, when a data stream 205 decides to leave the network, it can send a "final frame" to inform remaining data streams 205 in the burst to update their burst lists 420.

Embodiments of the invention may improve channel utilization by minimizing collisions per successful transmission. Embodiments may facilitate the digital home scenario with multiple HD video streams coexisting harmoniously. Embodiments can coexist with conventional EDCA MAC and can lead to improved performance for legacy devices. Embodiments may be implemented to operate in accordance with the future IEEE TG on Video Transport Stream (VTS).

The foregoing description of the preferred embodiments of the present invention is by way of example only, and other variations and modifications of the above-described embodiments and methods are possible in light of the foregoing teaching. Although the sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A method for registering a user equipment (UE) in an IP multimedia subsystem (IMS) the method comprising the steps of:

A system comprising:
  a processor;
  a memory;
  a medium access engine, which is processed by the processor and the memory, operative to contend for access to a channel and to control transmission of data streams, the data streams belonging to a particular access class of a plurality of different access classes, the medium access engine operative to discriminate quality of service based on the different access classes; and
  a burst channel access engine, which is processed by the processor and the memory, operative to maintain a burst list having a transmission order of stations which is generated based on a received order of the transmitted data streams and to control transmission of the data streams based on the transmission order of the stations in the burst list,
  wherein the transmitted data streams are separated in transmission by a short interframe space (SIFS) interval,
  wherein the burst channel access engine at a station generates the burst list after the medium access engine at the station gains access to the channel for a data stream of a particular access class, and for each data stream belonging to the access class, the burst channel access engine monitors transmission of other stations to form a burst list of access stations with data streams belonging to the access class, and
  wherein when the burst channel access engine at the station monitors the data stream of the particular access class, other stations on the burst list with data streams for the access class subsequently transmit after an SIFS interval, without any channel contention from data streams of other access classes during transmission of data streams from the particular access class.

2. The system of claim 1, wherein the system includes one of a station or an access point.

3. The system of claim 1, wherein the medium access engine performs an EDCA-based channel access thereafter granting channel access to stations in the transmission order of the burst list.

4. The system of claim 1, wherein the burst channel access engine updates the burst list after the medium access engine wins access to the channel.

5. The system of claim 4, wherein the burst channel access engine generates and updates the burst list by monitoring the received order of the transmitted data streams.

6. The system of claim 1, wherein the burst channel access engine identifies a previous data stream as a predecessor to a current data stream.

7. The system of claim 6, wherein the burst channel access engine controls transmission by awaiting the predecessor to complete a transmission and initiating transmission after a short interframe space (SIFS) interval.

8. The system of claim 7, wherein the burst channel access engine controls transmission by monitoring for a non-transmission by a scheduled station in the burst list and responding by updating the burst list.

9. The system of claim 8, wherein the burst channel access engine removes the scheduled station and at least one more station from the burst list.

10. The system of claim 1, wherein the burst channel access engine updates the burst list if a scheduled station doesn't transmit.

11. The system of claim 1, wherein the burst channel access engine removes a non-responding station from the burst list.

12. The system of claim 1, wherein the burst channel access engine maintains the burst list by monitoring for a data stream transmission by a new station belonging to the same access class to access the channel and updating the burst list to include the new station.

13. The system of claim 1, wherein the burst channel access engine updates the burst list if the transmission of a scheduled one of the data streams is not transmitted after waiting the SIFS interval based on the transmission order of the stations in the burst list.

14. A method comprising:
contending, by a medium access engine, for access to a channel;
controlling, by the medium access engine, transmission of data streams, the data streams belonging to a particular access class of a plurality of different access classes;
maintaining, by a burst channel access engine, a burst list having a transmission order of stations which is generated based on a received order of the transmitted data streams; and
controlling, by the burst channel access engine, transmission of the data streams based on the transmission order of the stations in the burst list,
wherein the transmitted data streams are separated in transmission by a short interframe space (SIFS) interval,
wherein the burst channel access engine at a station generates the burst list after the medium access engine at the station gains access to the channel for a data stream of a particular access class, and for each data stream belonging to the access class, the burst channel access engine monitors transmission of other stations to form a burst list of access stations with data streams belonging to the access class, and
wherein when the burst channel access engine at the station monitors the data stream of the particular access class, other stations on the burst list with data streams for the access class subsequently transmit after an SIFS interval, without any channel contention from data streams of other access classes during transmission of data streams from the particular access class.

15. The method of claim 14, further comprising updating the burst list after the medium access engine wins access to the channel.

16. The method of claim 15, wherein the updating includes monitoring the received order of the transmitted data streams.

17. The method of claim 14, further comprising identifying the previous data stream as a predecessor to a current data stream.

18. The method of claim 17, wherein the controlling transmission includes awaiting the predecessor to complete a transmission and initiating transmission after a short interframe space (SIFS) interval.

19. The method of claim 18, wherein the controlling transmission includes monitoring for a non-responding station and updating the burst list.

20. The method of claim 14, wherein the maintaining the burst list includes monitoring for a data stream transmitted by a new station belonging to the same access class to access the channel and updating the burst list to include the new station.

21. The system of claim 14, wherein the burst list is updated if the transmission of a scheduled one of the data streams is not transmitted after waiting the SIFS interval based on the transmission order of the stations in the burst list.

22. A system comprising:
contention means for contending for access to a channel;
transmission means for controlling transmission of data streams, the data streams belonging to a particular access class of a plurality of different access classes;
burst list means for maintaining a burst list having a transmission order of stations generated based on a received order of the data streams; and
burst access means for controlling transmission of the data streams based on the transmission order of the stations in the burst list,
wherein the transmitted data streams are separated in transmission by a short interframe space (SIFS) interval,
wherein the burst list means generates the burst list after the contention means at a station gains access to a channel for a data stream of a particular access class, and for each data stream belonging to the access class, the burst list means monitors transmission of other stations to form a burst list of access stations with data streams belonging to the access class, and
wherein when the burst list means at the station monitors the data stream of the particular access class, other stations on the burst list with data streams for the access class subsequently transmit after an SIFS interval, without any channel contention from data streams of other access classes during transmission of data streams from the particular access class.

23. The system of claim 22, wherein the burst access means updates the burst list if the transmission of a scheduled one of the data streams is not transmitted after waiting the SIFS interval based on the transmission order of the stations in the burst list.

* * * * *